United States Patent [19]

Hebert, Jr. et al.

[11] 3,848,181

[45] Nov. 12, 1974

[54] BATTERY TESTER WITH AN IMPROVED LOAD CIRCUIT

[76] Inventors: James O. Hebert, Jr., Box 1193; Donald F. Fitzgerald, Box 791, both of Mississippi State, Miss. 39762

[22] Filed: Sept. 18, 1973

[21] Appl. No.: 398,489

[52] U.S. Cl. .................................. 324/29.5, 320/48
[51] Int. Cl. ............................................ G01n 27/46
[58] Field of Search ....... 324/29.5; 320/48; 340/249

[56] References Cited
UNITED STATES PATENTS

| | | | |
|---|---|---|---|
| 3,432,743 | 3/1969 | Ford | 324/29.5 X |
| 3,483,393 | 12/1969 | Gutzmer et al. | 320/48 X |
| 3,546,576 | 12/1970 | Frezzolini | 324/29.5 |
| 3,593,099 | 7/1971 | Scholl | 320/48 X |

*Primary Examiner*—Alfred E. Smith
*Assistant Examiner*—Rolf Hille
*Attorney, Agent, or Firm*—Norvell E. Von Behren

[57] ABSTRACT

An improved load circuit which may be utilized among others with a battery tester and method for the breakdown testing of batteries. The improved tester of the preferred embodiment utilizes a new and novel load circuit comprising a plurality of power transistors connected in parallel to each other and being connected to a new and novel bus structure which assures that each of the transistors carries its share of the total load. The battery tester also utilizes new and novel means to cool and insulate the test leads from heat during the use of the tester. In the broadest form of the invention the new and novel load circuit utilizes at least one power transistor to carry the load of the circuit.

Also disclosed is a new and novel method for the breakdown testing of batteries utilizing the beforementioned load circuit.

14 Claims, 11 Drawing Figures

BATTERY TESTER WITH AN IMPROVED LOAD CIRCUIT

BACKGROUND OF THE INVENTION

This invention relates generally to a battery tester and more particularly to a new improved electrical load circuit for a breakdown tester designed for wet charge testing of lead acid batteries on the assembly line.

In the manufacture and assembly of batteries of the industrial and commercial type, it is desirous as a production test to check, with a high load current discharge device, each wet and fully charged battery before shipment, sale or use. The high load discharge test is common in the battery industry and is designed to check for bad or weak connections, broken or missing separators in the battery, short circuits caused by lead drips occuring during construction, incomplete formation, faulty plate connections and broken or cracked containers.

These evaluation tests of proper battery design are designed to improve quality control of battery production standards in order to meet standards set by the Battery Council International (BCI) and the Society of Automotive Engineers (SAE). The industry sanctioned and approved standards of the above organizations require that the batteries be charged at a rate equal to 1 percent of the 0°F (− 17.8°C) cranking performance test until all cells are gassing freely and the charge voltage and specific gravity of the electrolyte are constant over three successive readings taken at one hour intervals. During the charging periods the electrolyte temperatures are maintained between 60° and 110°F (15.6° and 43.3°C).

Three of the important tests, among others, utilized to measure battery performance are the cranking performance test, the reserve capacity test and the electric vehicle battery test. In the cranking performance test, the battery is charged according to the beforementioned procedures and the battery is placed in ambient air held at 0°F to ±2°F (−17.8°C ±1.1°C) until the temperature of a center cell reaches the rating temperatures ±1°F (±0.6°C). Thereafter with the battery at the rating temperature it is discharged at its rated current which is held constant ±1 percent throughout the discharge. The battery terminal voltage is measured under load at the end of 30 seconds except for diesel batteries which are measured at the end of 90 seconds. The terminal voltage for all batteries, except diesel, at 30 seconds shall be equivalent to 1.2 volts per cell or greater. The terminal voltage for diesel batteries at 90 seconds is supposed to be equivalent to 1.0 volts per cell or greater.

In the reserve capacity test, a battery is required to be able to provide power at normal temperatures as required for ignition, lights, etc. in the event of failure of the vehicle's battery recharging system. A reserve capacity rating is defined by the beforementioned organizations as the number of minutes a new fully charged battery at 80°F (26.7°C) can be discharged at 25 Amperes and maintain a voltage of 1.75 volts per cell or higher. In this test the battery, charged as before at a temperature of 80°F ±10°F (26.7°C ±5.6°C) is discharged at 25 Amperes to a terminal voltage equivalent to 1.75 volts per cell with the reserve capacity being the time of discharge in minutes.

The electric vehicle battery test is designed to simulate demands imposed on batteries engaged in supplying power to electric vehicles and commences with the battery being fully charged at an electrolyte temperature of 80°±5°F (26.7°C ±2.8°C). Thereafter the battery is discharged at the constant rate specified for the type battery being tested to a terminal voltage equivalent to 1.75 volts volts per cell with the discharge time in minutes being the battery capacity.

These and other tests are generally referred to as breakdown tests and/or performance tests and are conducted routinely by the battery manufacturer to detect defective batteries prior to shipment thereby guaranteeing the customer a higher reliability battery than would be possible without these tests. Breakdown tests are designed to place a sufficient load on the battery to cause defects to be revealed by a drop in the voltage at the battery terminals below some given value.

The present battery testers that are utilized for these, and other tests, generally utilize resistance loads in the electrical load circuit with the resistance loads being a plurality of either air cooled or water cooled resistors having connected thereto a plurality of electrical switches or switching devices which attempt to maintain the load constant for the tests. When using air cooled resistors, problems were encountered since the resistance of the load resistors increased as they became hot and while the first battery tested had one load resistance applied thereto, the next battery would have a higher resistance load applied and each succeeding battery would have different loads applied. Other problems developed with the water cooled power resistors that dictated a new and unusual approach to the problem which would eliminate the expensive and high maintenance switch gear associated with the air or water cooled resistors.

Prior art battery testers utilizing air or water cooled resistors with associated switching devices are shown in the U.S. Pat. No. 3,500,167, issued Mar. 10, 1970 to M.J. Applegate et al. wherein a plurality of fixed sensing resistors $R_1$ and $R_3$ are used in combination with relay contacts 112 (FIG. 2) in the load circuit. in a similar manner the U.S. Pat. No. 3,546,576, issued Dec. 8,1970 to J. A. Frezzolini utilizes a plurality of resistors 20, 22, 24 in combination with switch contacts 30A in the load circuit.

Another prior art reference of this general type is shown in the U.S. Pat. No. 3,593,099, issued July 13, 1971 to Hans K. Scholl which utilizes a plurality of resistors 39 (FIG. 6) in combination with a plurality of control relays 83 and their respective contacts 84 to place successive load resistor 39 from the resistor bank 38 in parallel with the battery powerlines 53.

With the prior art type switched resistance loads, the current drawn by the load was a function of the terminal voltage of the battery undergoing test as well as the value of the resistance load connected between the battery terminals. Since a breakdown test is generally conducted for a fixed period of time, not only does the power dissipation vary widely but, more importantly, there can be a wide range in the amount of charge removed from one battery to the other of the same type being tested while still passing the breakdown test.

In developing the subject new and novel load circuit of the invention to overcome the prior art deficiencies the following design criteria were used with great success:

a. Variable discharge loads and voltage drop limits were necessary to suit the differing sizes and capacities of batteries.
b. No load bearing electrical/mechanical contactor could be used thereby eliminating pitting, scarring and wearing.
c. No variation was possible of the selected load current as a factor of the electrical resistance due to temperature fluctuations, or due to change in terminal voltage of the battery.
d. A positive and accurate determination of the load and acceptance voltage was required.

SUMMARY OF THE INVENTION

In order to overcome the problems and difficulties inherent in the prior art devices, there has been provided by the subject invention, a new and novel elecrical load circuit which may be utilized for a battery tester and which comprises a plurality of power transistors connected in parallel to each other and connected to a new and novel bus structure in a manner that assures that each power transistor will carry its full share of the total load in the battery load circuit. Also disclosed is a new and novel means for insulating and cooling the test leads from the battery being tested. In addition to the above, there is disclosed an improved method for breakdown testing of batteries.

In the battery tester employing the new and novel circuitry, a constant current load is placed on the battery under test with the tester capable of constant current loads in the range of 0 to 1000 Amperes. Higher current capabilities are also possible by the addition of more power transistors in the new and novel load circuit of the basic tester.

The subject new and novel battery tester is designed to eliminate the variations in testing procedures and thus reduce the residual percentage of defective batteries that presently pass the breakdown tests as before mentioned. By maintaining a constant current load throughout the duration of the test period, the subject tester can withdraw the same amount of charge from every battery of a given size tested. In addition the current load and the amount of charge withdrawn can be varied to fit the size of the battery being tested.

Accordingly it is an object of the invention to provide a new and improved battery tester that is capable of maintaining a constant current load on all of the batteries being tested of one size during a prolonged testing period.

Yet another object of the invention is to provide a new and novel electrical load circuit for a breakdown battery tester utilizing a plurality of power transistors as the load.

Another object of the invention is to provide a new and novel bus structure for mounting the above power transistors so that each transistor carries its full share of the current in the load circuit.

Yet another object of the invention is to provide a new and novel means of simultaneously insulating and cooling the test leads of the battery tester.

Still yet another object of the invention is to provide an improved method of breakdown testing of wet charge batteries wherein a constant current load ranging from 0 to 1000 Amperes can be easily obtained.

Another object of the invention is to eliminate load bearing electrical/ mechanical switching contactors used in the load circuits of prior art battery testers.

A further object of the invention is to provide a battery tester having no load variations in the selected load as a result of electrical resistance change due to temperature fluctuations.

Still yet another object of the invention is to provide a new and improved battery tester which allows positive and accurate determination of the load and acceptance voltage.

Another object of the invention is to provide a new and improved battery tester having improved cooling means for cooling the heat generating portions of the tester.

A further object of the invention is to provide an improved load circuit that utilizes at least one power transistor as the load.

These and other objects and advantages of the invention will become apparent after a review of the drawings and a study of the description of the preferred embodiment.

DESCRIPTION OF THE PREFERRED EMBODIMENT

Figures 1, 2:
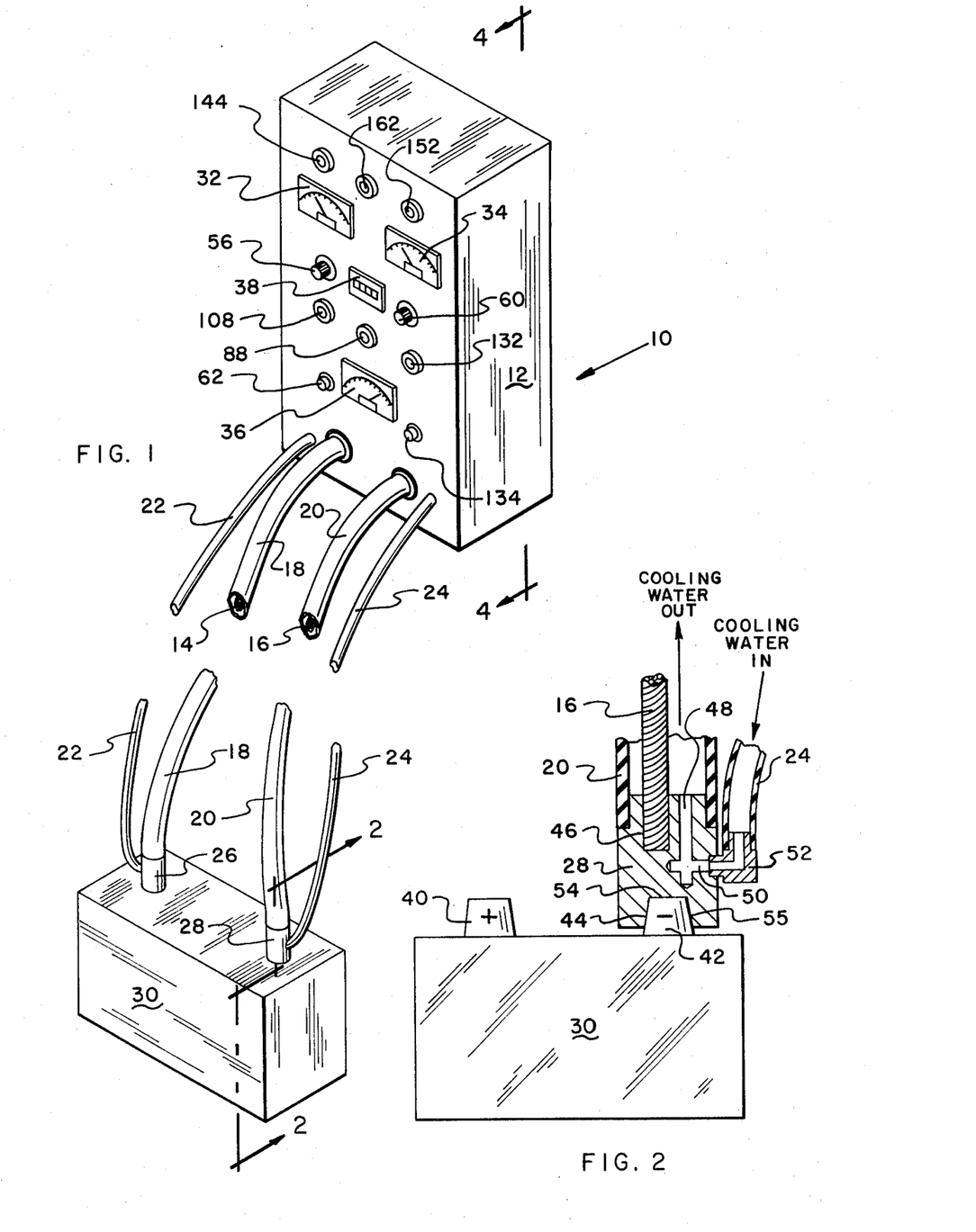
FIG. 1 is a perspective view of the new and novel battery tester of the subject invention showing the outside of the tester case and also showing a battery connected to the tester.
FIG. 2 is a partial side sectional view taken along line 2—2 of FIG. 1 showing the new and novel battery terminal connection which is utilized to connect to the battery terminal, insulate the battery terminal test leads and also to cool the terminal and test leads during the breakdown tests.

Referring now to the drawings in general and in particular to FIG. 1 of the drawing there is shown a perspective of the subject battery tester, shown generally by the numeral 10 which comprises an external case 12 having a plurality of test leads 14 and 16 externally positioned on the lower portion of the case. The terminal 14 is the positive test lead terminal and the terminal 16 is the negative test lead terminal.

Surrounding the test leads 14 and 16, for electrical insulation, are a pair of hollow flexible plastic tubings 18 and 20 which serve also as the means for containing cooling water circulating within the tubings for cooling the test leads as will be described more fully hereinafter. Also externally positioned in proximity to the tubings 18 and 20 are a pair of cooling water inlet tubings 22 and 24 which initiate inside the tester case 12 and terminate at the terminal connectors 26 and 28 of the battery 30 which is being tested.

The battery tester case 12 also contains on the face thereof a battery current meter 32 and a battery voltage meter 34 as well as a test timer 36 and time indicator 38 along with a plurality of test lights and test switches.

Referring now to FIG. 2 of the drawing, the test battery 30 has formed thereon a positive terminal 40 as well as a negative terminal 42 of a size somewhat different than the positive terminal. The battery terminal connector 28 may be formed from solid brass or some other acceptable electrical conductor and contains a tapered recess 44 on the bottom thereof which is sized to fit snuggly over the battery terminal 42 as shown in FIG. 2. The connector 28 also has formed on the top thereof a cylindrical recess 46 which is designed to receive the test lead 16 which is soldered in place in the recess 46 to provide a good electrical connection thereto.

The connector 28 has formed therein a pair of connecting drilled water passageways 48 and 50 in the manner shown in FIG. 2 to which is connected, by a fitting 52, the cooling water tube 24 utilized for the cooling of the negative test lead 16 and battery connector 28. Surrounding the upper portion of the battery terminal connector 28, and fixedly attached thereto by means well known in the art, is the flexible plastic tube 20 which acts as a means for containing the cooling water as well as means for electrically insulating the user of the tester from the test lead 16 contained within the tubing 20.

While not shown in the FIG. 2 of the drawing, for brevity's sake, it is understood that the positive terminal 40 would have its battery connector 26 formed in a manner similar to the battery connector 28. In forming the connectors it is preferable to position the drilled water passages 48 and 50 as close to the battery terminals as possible since it has been found that a large portion of the heat generated in the connectors and test leads is generated from the upper surface 54 of the battery terminals as well as the tapered surfaces 55. This is caused by the fact that the upper surface 54 and the tapered surfaces 55 do not always make good electrical contact with the bottom and side surface of the tapered recess 44 in the connector thereby causing electrical arcing and subsequent heat generation.

Figure 3:
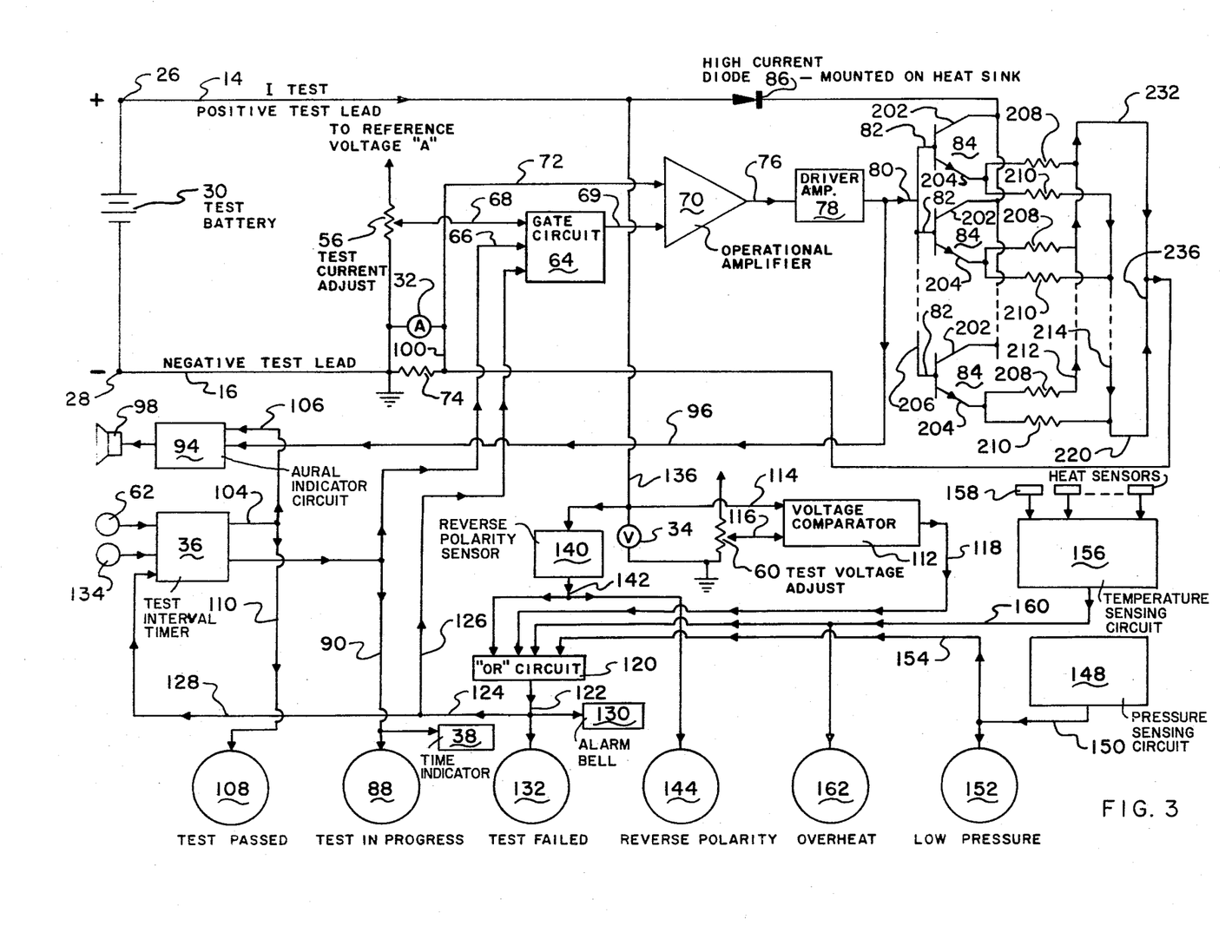
FIG. 3 is an electrical wiring diagram of the battery tester as described in the preferred embodiment of the invention; showing the new and novel electrical load circuit using a plurality of power transistors.

Turning now to FIG. 3 of the drawing there will be described the electrical circuitry and operation for the battery tester in order to more fully understand the spirit and scope of the invention. The battery 30, under test, is connected to the terminal connectors 26 and 28 and a test current adjust potentiometer 56 is set to the desired value of current such as 750 Amperes in which case the direct reading potentiometer would be set for 750. A test interval timer 36 is then set to the desired time such as 4 seconds which would remove 3,000 Coulombs of charge from the battery with the test current adjust set at 750 Amperes.

The test voltage adjust 60 is then set to the minimum allowable terminal voltage for the size battery being tested and the test conditions being utilized such as 5.75 volts. Once the test current adjust 56, the test interval timer 36 and the test voltage adjust 60 have been set for a given size battery, they do not require resettings until is is desirable to vary one or more of the test parameters.

A test start switch 62 is momentarily depressed and the test cycle is begun. A gate circuit 64 receives an "on" voltage from the interval timer through the line 66 and opens to allow the test current adjust 56 voltage through line 68 to pass through line 69 to the operational amplifier 70 which compares this voltage and the voltage through line 72 obtained due to the current flowing through an ammeter shunt 74. This produces an output signal through line 76 proportional to the difference between the two input voltages which is then further amplified by a driver amplifier 78 and is then sent through line 80 to the bases 82 of a plurality of power transistors 84 controlling the amount of test current that is allowed to pass through the battery being tested through the test lead 14. The sturcture and novelty of the power transistor portion of the circuitry will be detailed more fully hereinafter.

All of the battery current passes through a series circuit comprising a high current diode 86, the plurality of power transistors 84, connected in parallel with each other, and through the ammeter shunt 74. The function of the high current diode is to prevent damage to the power transistors 84 in the event the battery 30 is connected in reverse polarity at the terminal connectors 26 and 28. While in the preferred embodiment, a high current diode or reverse current means is utilized it is within the spirit and scope of the invention that a silicon controlled rectifier or other means could be used and in addition this reverse current means could be located in series with either the test leads 14 or 16. The high current diode, used in the preferred embodiment, is mounted on a heat sink in order to dissipate the heat generated therein which can be as high as 1000 watts since it has a voltage drop across it of approximately 1 volt when the test current is as high as 1000 Amperes.

The "on" voltage through line 66 also serves to light a yellow "test in progress" indicator lamp 88 through line 90 and to run a time totalizer meter 38 which indicates the total test time that has accumulated on the tester. The output from the driver amplifier 78 also serves to turn on an aural indicator circuit 94 through line 96 which sounds a distinctive three note chord through the loudspeaker 98 while the test is in progress.

The ammeter shunt voltage, through line 100 also serves to power a panel mounted ammeter 32, giving a visible indication to the operator that the test current (I Test) is the same as that set on the current adjust 56. If the battery 30 under test maintains a terminal voltage greater than that set on the test voltage adjust 60 for the duration of the time interval set on the test interval timer 36, at the end of the test period the test interval timer removes the "on" voltage from the gate circuit 64 thereby turning the test current (I Test) off in the test lead 14.

The logic circuitry associated with the test interval timer 36 then sends a signal through line 104 to the aural indicator circuit 94 through line 106 to asound a single momentary note to audibly signal the operator that the test was passed. This same signal also turns on a green "Test Passed" indicator lamp 108 through line 110 which remains on until the next test begins.

During the test, a voltage comparator circuit 112 compares the battery terminal voltage at line 114 with the voltage at line 116 from the test voltage adjust potentiometer 60. If the battery terminal voltage in line 114 drops below the voltage in line 116, which is the minimum acceptable terminal voltage for the battery under test set at the test voltage adjust 60, the voltage comparator circuit 112 produces an output through line 118 which is sent to the "or" circuit 120. Any input to the "or" circuit 120 produces an output through line 122 which serves to cut off the gate circuit 64 through line 124 and 126 which in turn cuts off the test current (I Test) in the test lead 14. This same output in line 122 also resets the test interval timer through line 128, sounds an alarm bell 130 and lights a red "Test Failed" indicator lamp 132. The alarm bell 130 and the "Test Failed" light 132 remain on until the manual stop 134 is depressed momentarily, which in turn resets the entire tester to the same conditions that would have existed had the test been passed. The tester is then ready to test the next battery.

The battery terminal voltage at line 136 is utilized to operate a panel mounted voltmeter 34 giving the operator a visible indication at all times of the actual terminal voltage of the battery being tested. In the event the polarity of the test battery 30 is opposite to that intended, the high current diode 86, which allows current to flow in the forward direction only, protects the plurality of power transistors 84 from the damaging high reverse current that would result if the diode 86 were not utilized. Without the diode 86 or its equivalent, the instant the reversed polarity battery 30 was connected at the test connectors 26 and 28, an extremely high reverse current might flow causing immediate destruction of part or all of the plurality of power transistors 84.

A reverse polarity condition, if it occurs, is detected by the reverse polarity sensor 140 causing an output voltage through line 142 to be sent to the "or" circuit 120 and to light a red "Reverse Polarity" indicator lamp 144. The voltage at line 142 going to the "or" circuit 120 produces an output in line 122 which sounds the alarm bell 130, as previously described, and lights the red "Test Failed" indicator lamp 132 until the manual stop 134 is depressed. The reverse polarity indicator lamp 144 being on at the same time as the "Test Failed" lamp 132, shows the operator that the test battery 30 has reverse polarity.

Coolant is circulated through the heat sink structure associated with the plurality of power transistors, as will be described in greater detail hereinafter, to dissipate the heat produced in the high current diode 86 and the plurality of power transistors 84. If the heat is not carried off, the diode and the transistors can be destroyed. In order to protect these components from heat destruction, two additional safety features are utilized in the tester. These comprise a heat sink coolant pressure sensing circuit 148 which reacts, if the coolant is not circulating through the heat sink, to send a signal through line 150 to light the red low pressure indicator lamp 152 and to the "or" circuit 120 through line 154 to sound the alarm bell 130, light the fail lamp 132 and shut off the battery test current (I Test) as hereinbefore described. The presence of the red low pressure lamp 152 in addition to the fail lamp 132 lets the operator know that there is insufficient coolant flow in the heat sinks for safe operation of the tester. As mentioned before, the manual stop 134 must be depressed to shut off the alarm 130 and to prepare the tester for use. If the cause for the alarm has not been corrected, such as raising the coolant pressure, the alarm will go off again as soon as the manual stop button 134 is released.

The second safety feature is a temperature sensing circuit 156. A plurality of heat sensors 158 are mounted on the heat sink structure and are utilized to sense if the temperature exceeds a pre-set value which is set below the maximum safe operating temperatures of the components concerned such as the power transistors 84 and the high current diode 86. If the temperature exceeds this value, the temperature sensing circuit 156 sends a signal through line 160 to light the red overheat indicator lamp 162, and to the "or" circuit 120 to sound the alarm bell 130, light the fail lamp 132 and shut off the test current (I Test) as previously described. The presence of the overheat lamp 162 in addition to the fail lamp 132 lets the operator know that the tester is too warm for continued operation. As before, the manual stop 134 must be depressed to reset the tester and the alarm will immediately go off again as soon as the manual stop 134 is released, unless the cause for the alarm, such as excessive temperature in this case, has been corrected.

In running battery capacity tests, the battery 30 under test is usually leaded with a relatively small value of test current (I Test) for a relatively long period of time ranging from several minutes to several hours. A switch utilized in conjunction with the test interval timer 36 provides for continuous operation of the tester (a semi-infinite time interval). This switch disables the aural indicator circuit 94 during continuous operation. Other than the size of current and voltage settings utilized in this test, plus the fact that no specific time interval is used, the only other difference in this test and the breakdown test is that the initial reading of the time totalizer 38 is recorded unless the totalizer is reset to zero for the test.

In the capacity test, the constant current load is maintained until the battery terminal voltage 34 drops down to that set on the test voltage adjust potentiometer 60. When this occurs, as previously described, the voltage comparator circuit 112 sends a signal through line 118 to the "or" circuit 120 to sound the alarm bell 130, light the fail lamp 132 and to shut off the test current (I Test). Since the time totalizer 38 only runs while the test is in progress, its final reading is utilized, along with its initial reading, to determine the length of time it took the battery terminal voltage to drop to the minimum usable value. This test, in seconds, multiplied by the constant value of test current, in amps, that was utilized in the test gives the charge in Coulombs that was removed from the battery during the test.

While the before-mentioned description, with the exception of the plurality of power transistors 84 and the high current diode 86 and its related circuitry, has been described in detail in order to better understand the new and novel invention, it can be generally referred to as a means being associated with the power transistors and their bus structure for sensing the amount of load current and for controlling the power transistors to control the current that is allowed to pass through the battery being tested.

Having described the general operation and circuitry of the battery tester there will now be described in detail the new and novel electrical load circuit and in particular the power transistor bus structure and its associated heat sink structure.

Figure 4:
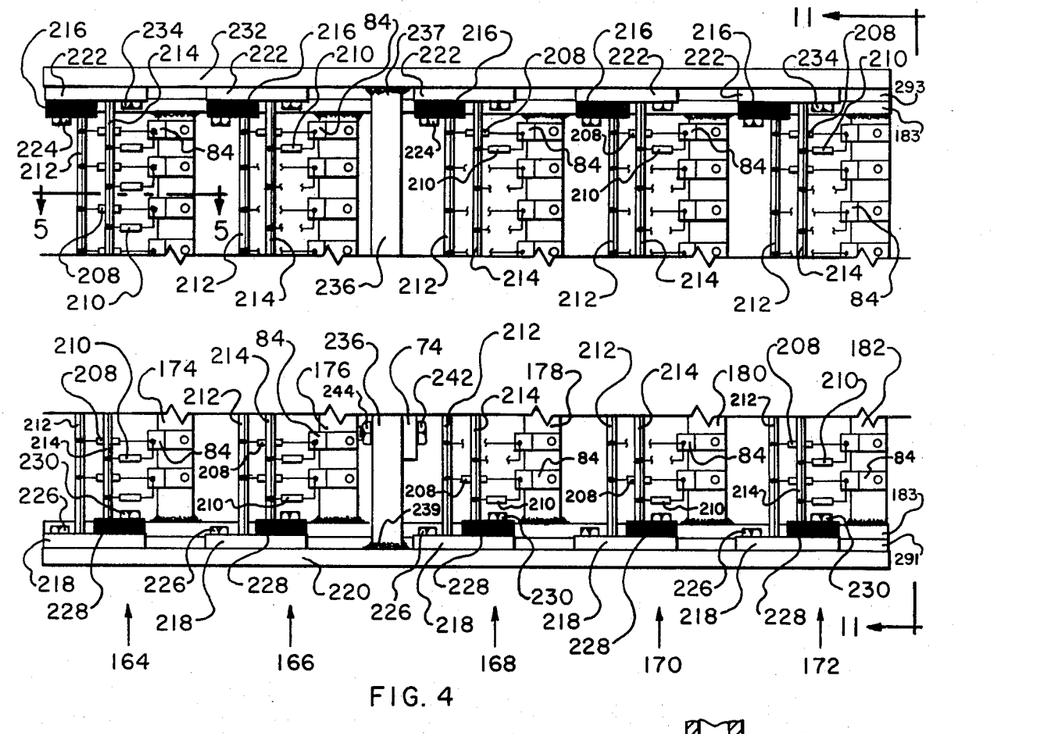
FIG. 4 is a rear view, taken along line 4—4 of FIG. 1 of the battery tester showing the new and novel construction of the power transistor bus structure of the subject invention.

Referring now to FIGS. 4–6 of the drawings there is shown in FIG. 4 the new and novel use of the plurality of power transistors 84 in the load circuit of the subject battery tester and in particular the novel bus structure to which those transistors are connected. The transistors 84 comprise a plurality of 250 transistors in total, in the preferred embodiment, and are broken down into five load banks, shown generally by the numerals 164, 166, 168, 170 and 172 which contain fifty each of the load transistors 84. These transistors may be of the type manufactured by General Electric Co. and sold under the designation D44 $H_2$ and are capable of carrying a total load of 1,000 amps when that is desired during operation of the battery tester.

Figure 5:
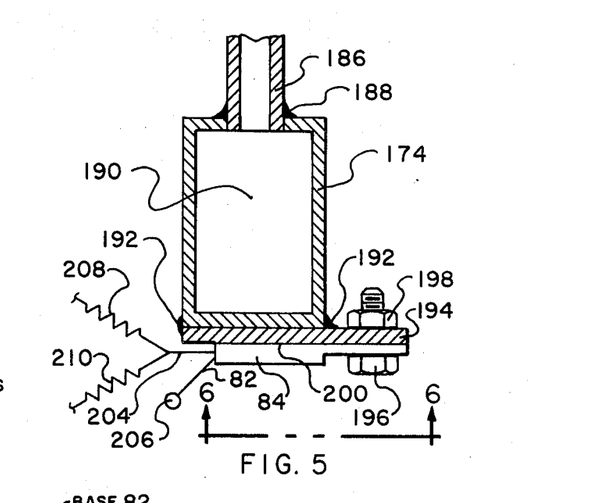
FIG. 5 is a sectional view, taken along line 5—5 of FIG. 4 showing the mounting of the power transistor on the heat sink structure of one of the power transistor banks and showing, in schematic form, the connections of the power transistor to their respective parts.

The 50 transistors 84 on each bank are fixedly attached to the heat sinks 174, 176, 178, 180 and 182 as shown more clearly in FIG. 5 of the drawing. The heat sinks may be formed of rectangular copper tubing and in the preferred embodiment they are formed of rectangular waveguide and have their ends sealed by silver soldering the wave guide to a brass flange 183 (not shown in FIG. 5). Each heat sink has an inlet connection 184 and an outlet connection 186 fixedly attached thereto by means well known in the art such as by means of a solder connection 188. The inlet connection 184 along with the outlet connection 186 serve as a means for allowing coolant (such as water) to circulate through the central portion 190 of the heat sinks.

Figure 6:
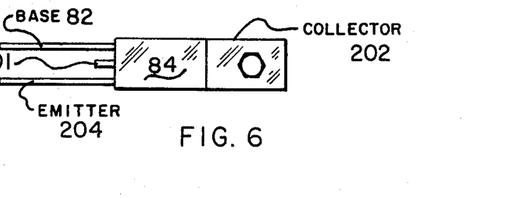
FIG. 6 is a side view, taken along line 6—6 of FIG. 5, showing the power transistor and further showing the connections of the transistor with the collector connections shown cut off.

Each heat sink has fixedly attached thereto, by means of the solder connections 192, a brass strip 194 which runs for the entire length of the heat sink or approximately 36 inches long. To the brass strip 194, along the length of the heat sink, are bolted the plurality of power transistors 84 by means of the bolt 196 and nut 198. In this way a tight connection is assured between the metal mounting tab surface 200 of the transistor 84 and the brass strip 194 to insure good heat transfer to the heat sink as well as good electrical transfer since the collector wire 201 of each transistor collector 202 is cut off at the transistor, as shown in FIG. 6, and the wave guide heat sink is utilized as a common collector bus since the collector wire 201 is electrically common with the transistor metal mounting tab surface 200. This requires the heat sink to be electrically insulated at its top and bottom from the polarity of the emitter bus structure.

Figure 7:
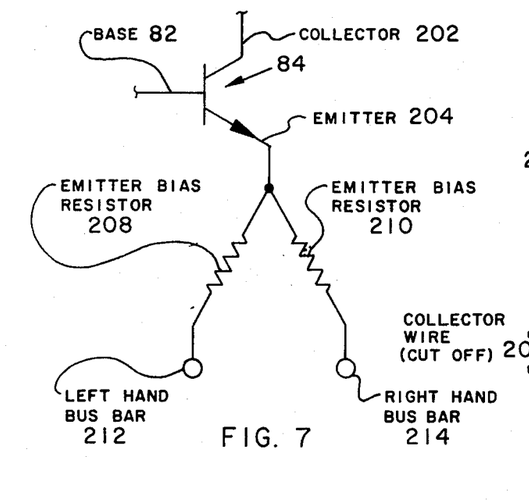
FIG. 7 is an enlarged schematic view of the power transistor, primarily showing the connection of the emitter to the plurality of emitter bias resistors which are in turn connected to their respective left or right-hand bus bars.

Each transistor 84 also has an emitter 204 as well as a base 82. The bases 82 of all of the transistors in each bank are connected to a base bus 206, as shown in FIG. 5 while the emitters 204 are connected to a plurality of emitter bias resistors 208 and 210 which are in turn connected to a left-hand bus bar 212 and a right-hand bus bar 214 as shown in FIG. 7 and FIG. 4. By the designation right and left-hand bus bars it is meant that there are at least two bus bars which are electrically insulated from each other and are electrically connected as shown in the drawing. It is not, within the spirit and scope of the invention, to mean the physical location of each bus bar since these bars and the transistors could also be located in a horizontal manner as to each other within the scope of the invention.

The purpose of the emitter bias resistors 208 and 210 is to equally distribute the load current among the transistors 84. If for any reason any one transistor begins to draw more than its proportionate share of the total load current, the voltage drop across the emitter bias resistors will increase, thus causing a decrease in the base-to-emitter bias voltage and a resultant decrease in current drawn by the collector. Since a small change in base-to-emitter bias voltage causes a large change in collector current, and all bases are held at the same potential by a common bus connection, all emitters will thus be maintained at approximately the same potential by this self-regulating feature. This insures that all emitter (and thus collector) currents will be approximately equal.

The left-hand bus bar 212 of each bank of transistors is mounted at its top end in an insulator 216 and at its bottom end is electrically connected to a brass strip 218 which is also electrically connected to a horizontal brass bus bar 220. The insulator 216 is held in place on a brass strip 222 by means of a bolt 224 while the brass strip 218 is held in place on the bus bar 220 by means of the bolt 226.

The right-hand bus bar 214 of each bank of power transistors is mounted at its top end in the brass strip 222 and is electrically connected thereto while the bottom end of the right-hand bus bar 214 is mounted on the insulator 228 which is held in place on the brass strip 218 by means of the bolt 230. The brass strip 222 is held in place and electrically connected to an upper horizontal bus bar 232 by means of a bolt 234. From this it can be seen that the right-hand bus bar 214 is electrically connected to the upper horizontal bus bar 232 and is electrically insulated from the lower horizontal bus bar 220 while the left-hand bus bar 212 is electrically connected to the lower horizontal bus bar 220 while being electrically insulated from the upper horizontal bus bar 232. This connection of the individual bus bars to a common terminal causes half of the load current to flow upward through the right-hand bus bar 214 and half downward through the left-hand bus bar 212. By connecting the bias resistors in this manner to their respective bus bars, the power transistors will not burn out as they would if they were operating at or near their rated current capacity and if the bias resistors has been connected in parallel.

While the round left-hand bus bar 212 and the right-hand bus bar 214 are large enough to carry the current that is handled at the 1,000 Ampere capacity of the tester, they have sufficient voltage drop developed along them to upset the bias voltages on the transistors 84 in various locations had these buses been connected in what, at first glance, would seem to be the obvious manner, electrically connected to each other at both ends in parallel where they are connected to the horizontal bus structure 232 and 220.

In the preferred embodiment, the emitter bias resistors 208 and 210 are approximately equal to each other and are sized at 0.39 ohms for satisfactory performance. As before mentioned, the high current diode can be located in the positive test lead line 14 or the negative test lead line 16. When located in the negative test lead line it would be preferable to locate it in close proximity to the vertical bus bar 236 and the heat sink coolant supply for purposes of convenience and it could be physically mounted between the vertical bus bar 236 and the Ammeter Shunt 74.

The central vertical bus bar 236 is connected at its upper end, by means of solder 237, to the horizontal bus bar 232 and is connected at its lower end, by means of solder 239, to the horizontal bus bar 220. It has located centrally thereon one end of the Ammeter Shunt 74, being connected thereto by means of a bolt 242 and nut 244. The opposite end of the Ammeter Shunt is connected to the negative test lead 16.

Figure 8:
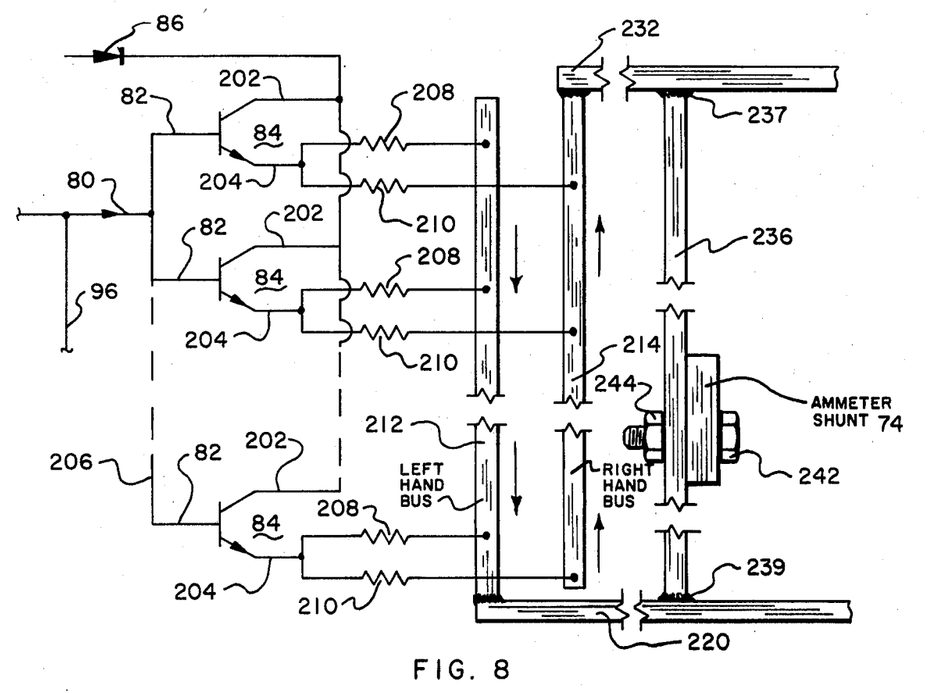
FIG. 8 is an enlarged schematic of the power transistor portion of the subject invention showing, in diagrammatic form, the connection of one bank of right and left bus bars to the total bus structure and to the emitter bias resistors for that bank.

The new and novel load bus structure is also shown diagrammatically in FIG. 8 of the drawing which illustrates how a bank of power transistors 84 are connected with the emitter bias resistors 208 and 210 being connected to their respective left-hand bus 212 or right-hand bus 214. While in the preferred embodiment two bias resistors 208 and 210 are shown for each power transistor 84 it is conceivable that more than two could be utilized by increasing the number of left and right-hand bus bars without departing from the spirit and scope of the invention.

While the preferred embodiment utilizes a plurality of power transistors for the load, it is within the spirit and scope of the invention that at least one power transistor, of sufficient capacity, could be utilized in the future whenever the state of the art in transistor design has advanced to enable one to be produced that could carry the load that would be needed in a battery tester. By using one power transistor, the bias resistors and their associated bus structures could be eliminated thereby reducing the overall cost of the battery tester.

Figure 9:
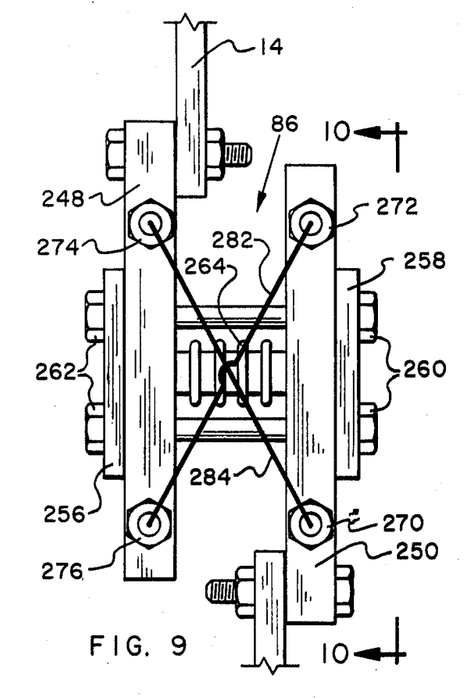
FIG. 9 is an enlarged view showing the mounting of the high current diode in its heat sink sturcture and further showing the coolant connections.
Figure 10:
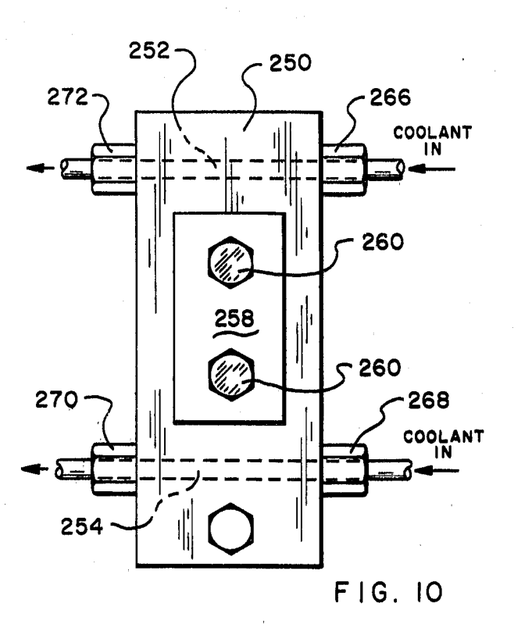
FIG. 10 is a view taken along line 10—10 of FIG. 9 further showing the coolant connections to the diode heat sink structure.

Turning now to FIGS. 9 and 10 there is shown the heat dissipating means for dissipating the heat generated within the reverse current means 86 which comprises a heat sink comprising a pair of elongated plates 248 and 250 having a passageway 252 and 254 drilled therethrough. Positioned on each side of the plates 248 and 250 is another pair of plates 256 and 258 having drilled holes therein for receiving a pair of elongated bolts 260 which also extend through holes drilled in the plates 248 and 250 to receive a pair of nuts 262.

Suspended between the plates 248 and 250 and being held under approximately 2,500 lbs. force for good heat transfer and electrical connection is a high current diode 264 of the type manufactured by General Electric. As before mentioned the high current diode heat sink in the subject tester may have to dissipate as much as 1,000 watts so therefore means must be provided to assure that the diode obtains adequate coolant in its heat sink to prevent its being destroyed in the event the heat sink cooling passages are clogged. As shown in FIGS. 9 and 10, the plate 250 has attached thereto a tubing fitting 266 and 272 at the ends of passageway 252 while the passageway 254 has attached thereto fittings 268 and 270. In a similar manner the plate 248 has drilled therethrough a pair of passageways 252 and 254 (not shown in FIG. 9) along with fittings 274 and 276 (shown in FIG. 9) and fittings 278 and 280 (not shown in FIG. 9 but opposite to the fittings 274 and 276 on the plate 248. In order to provide added safety from failure of the coolant source, a coolant line 282 (shown in FIG. 9 as a heavy solid line) connects between fittings 272 and 276 while a coolant line 284 connects between fittings 270 and 274. By cross-connecting the coolant lines 282 and 284 at least half circulation of the coolant is assured in the plates 248 and 250 in the event any of the coolant passageways are clogged which guarantees that the high current diode 86 will not be destroyed for lack of coolant.

Figure 11:
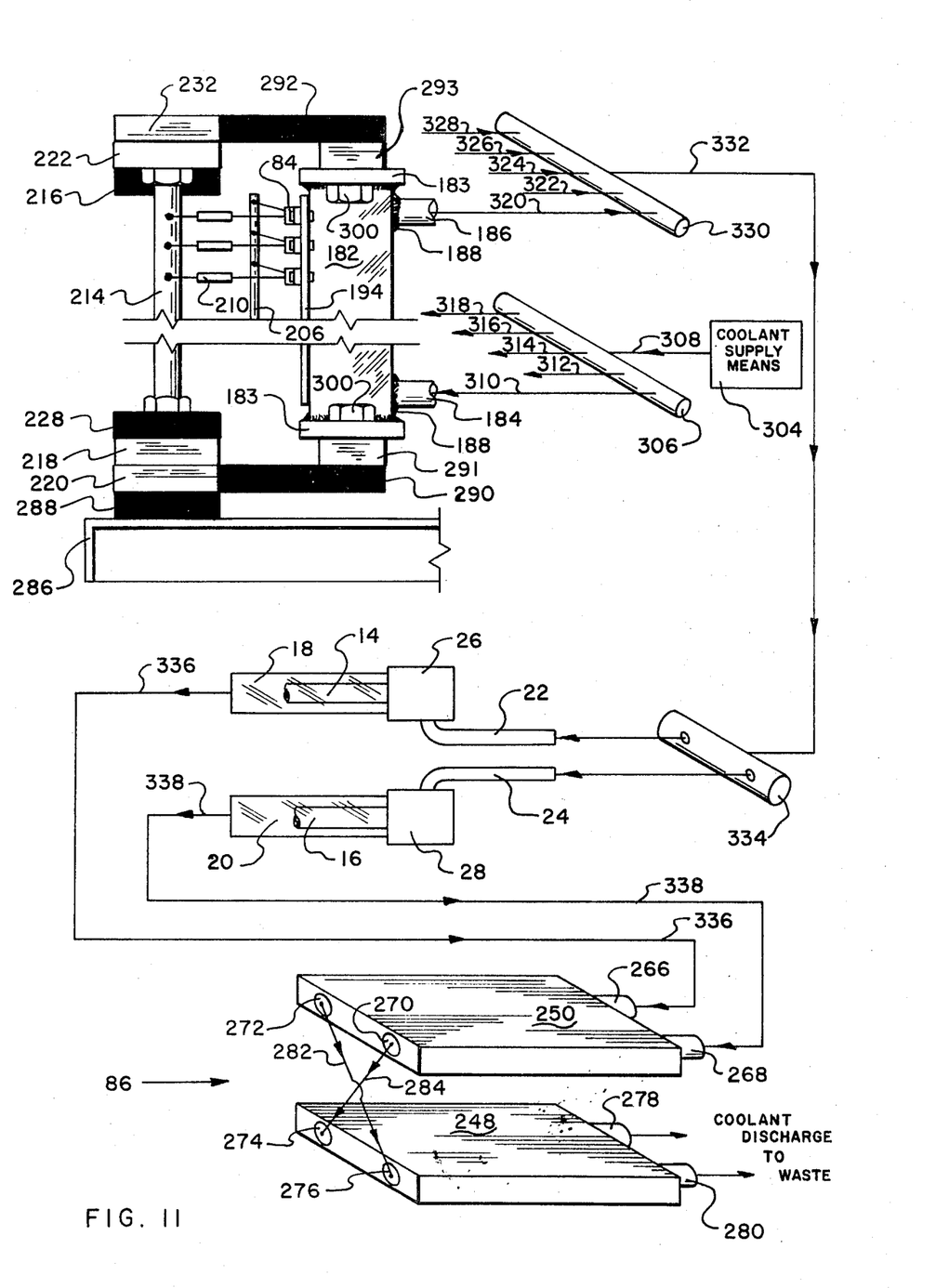
FIG. 11 is a partial sectional view, taken along line 11—11 of FIG. 4 showing the power transistor heat sink sturcture and further showing, in diagrammatic form, the total coolant supply system.

Turning now to FIG. 11 of the drawing there is shown a section taken along line 11—11 of FIG. 4 showing, in greater detail, the heat sink or heat dissipating means for the power transistors 84 as well as showing, in diagrammatic form, the total coolant circuit for the battery tester. As before mentioned, the emitters 204 for the transistors 84 are connected to the emitter bias resistors 208 and 210 which in turn connect to the left-hand bus 212 or the right-hand bus 214 which are alternately connected to the brass strips 218 or 222. The lower horizontal bus bar 220 is electrically insulated from the battery tester chassis 286 by means of the insulator 288 and the heat sink 182 is electrically insulated also from the bus bars 212 and 214 by means of the insulators 290 and 292. The horizontal bars 291 and 293 electrically connect, by means well known in the art, the heat sinks 174, 176, 178, 180, and 182 together at their upper and lower ends through the brass flanges 183. A pair of bolts 300 retain each heat sink between its upper and lower insulators 292 and 290 and the upper and lower horizontal bars 293 and 291.

While not shown in FIG. 4, for clarity purposes but shown in FIGS. 11 and 5, the bases 82 of each power transistor of the respective banks are connected to a base bus 206 by means well known in the art. As before mentioned the heat sink 182 as well as the other heat sinks have connected at their upper ends a coolant outlet connection 186 with a similar inlet connection 184 being rigidly held in place by means of solder 188 or other means.

Referring now to the remainder of FIG. 11 there is shown, in diagrammatic form, the coolant circuit for the preferred embodiment which comprises a coolant supply means 304 which may comprise water, oil or other known coolant sources in combination with a coolant pump and supply reservoir or other supply means. The coolant supply means 304 supplies coolant under pressure to an inlet header 306 by means of a supply line 308. Discharging from the supply header, and shown by means of the plurality of arrows 310, 312, 314, 316 and 318, are individual supply lines that connect the supply header 306 to the respective heat sinks 182, 180, 178, 176 and 174 of the load banks 172, 170, 168, 166 and 164.

Each heat sink has connected to its outlet connection 186, an individual discharge line, shown generally by the arrows 320, 322, 324, 326 and 328 which lines terminate in a discharge header 330. This header is in turn connected, by means of supply line 332 to a supply header 334 for supplying the coolant tubes 22 and 24 as before described. Also as before described, the tubes 22 and 24 are connected to the battery terminal connectors 26 and 28 which are in turn connected to the plastic tubing 18 and 20 resulting in cooling the test leads 14 and 16.

The coolant then passes, by means of supply lines 336 and 338 to the high current diode 86 to enter at fittings 266 and 268 and to exit at fittings 278 and 280 as before described, after crossing by means of lines 282 and 284 as shown in FIG. 9. The coolant then may be discharged to waste or recirculated as desired. For brevity, various supply and discharge valves are not shown in the coolant system but would be utilized as is known in the fluid flow art.

As before mentioned the high current diode 86 may be replaced by a silicon controlled rectifier and the power transistors, while being NPN type in the preferred embodiment, may be replaced with PNP transistors within the spirit and scope of the invention recognizing that other minor changes may have to be made to the circuitry to accommodate these changes.

When the subject battery tester was placed on the assembly line, it was determined that more uniform results were obtainable by selection of a minimum acceptance voltage of 4.25 volts for 12 volt batteries and 2.25 volts for 6 volt batteries and by varying the load placed on the batteries to suit their construction, size and capacity. Other battery construction techniques or other uses of the tester may make it desirable to vary the load/voltage relationships which may be quickly set on this tester.

It has also been determined by plant tests, that closer tolerances of acceptance could be used thereby increasing the in-plant rejection rate with a corresponding decrease of the in-the-field rate of return being expected. Using closer tolerances with the constant load of the subject tester allows batteries 5 percent undercharged or discharged to be isolated and a battery with one plate with a faulty connection in one cell out of six in series to be rejected. No other prior art tester, to the applicant's knowledge, has this accuracy, ease of change, variability of load and reliability of operation.

The variance of the time cycle, load and minimum acceptance voltage can be further used to provide battery design and quality control information. The cranking performance test can be run during shipping hours as the time required is usually less than 500 seconds. Changes to the tester, for the test are load current, time and terminal voltage with the complete set-up time being less than one minute. The reserve capacity test can be run after battery shipping hours since the normal test duration is 50 to 150 minutes. The automatic sequence built into the tester allows the test to be run without a monitor with changes being required, for the test, to the discharge load, time and terminal voltage.

The electric vehicle battery test uses a similar sequence to the reserve capacity test but with different load settings and different terminal voltages with the time in the last two mentioned tests being the determinate of the ratings. The subject battery tester, like none on the market today, can provide for infinite variability in the discharge current (load) termination voltage and the time together to allow a test to be run on a battery to determine exactly any specific load/voltage relationship with great accuracy. In addition, since no other known tester is actuated without some electromechanical load bearing contact, the reliability of the subject tester will not be equaled by any other tester on the market.

From the foregoing it can be seen that there has been provided by the subject invention a new and improved load circuit and method that accomplishes all of the objects and advantages of the invention as before mentioned. It should be apparent many changes can be made in the invention without departing from the spirit and scope thereof and the foregoing description of the preferred embodiment has been given by way of illustration only.

Having described our invention, we claim:

1. An electrical load circuit for a battery tester for testing batteries having positive and negative terminals and wherein the load current that is allowed to pass through the battery is sensed and controlled, comprising:
   a. a plurality of test leads, each lead having attached thereto a terminal battery connector;
   b. reverse current means, associated with one of the test leads, for preventing a reverse flow of current;
   c. a plurality of power transistors, associated with the test leads, said power transistors being connected in parallel to each other and in series with the reverse current means;
   d. at least a first bus structure associated with the power transistors;
   e. at least a second bus structure associated with the power transistors and electrically insulated at its one end from the first bus structure and electrically connected through its other end to the first bus structure, the bus structures also being electrically connected to one of the test leads; and
   f. at least two emitter bias resistors being connected at a common point to the emitters of each power transistor, the opposite end of one bias resistor being connected to the first bus and the opposite end of the other bias resistor being connected to the second bus.

2. The load circuit as defined in claim 1 further comprising:
   g. heat dissipating means, associated with the load circuit, for dissipating the heat generated by the load circuit.

3. The load circuit as defined in claim 1 further comprising a plurality of heat dissipating means, associated with the reverse current means, the power transistors, the test leads and the terminal battery connectors, for dissipating the heat generated by the load circuit.

4. The load circuit as defined in claim 3 wherein the plurality of heat dissipating means are connected in series with each other and comprise a coolant system having circulated therein a coolant.

5. An electrical load circuit for a battery tester for testing batteries having positive and negative terminals and wherein the load current that is allowed to pass through the battery is sensed and controlled, comprising:
   a. a plurality of test leads, each lead having attached thereto a terminal battery connector;
   b. reverse current means, associated with one of the test leads for preventing a reverse flow of current to the battery;

c. a plurality of power transistors connected in parallel to each other and in series with the reverse current means;
d. heat dissipating means, associated with the power transistors and the reverse current means, for dissipating the heat generated within the power transistors;
e. at least a first bus structure associated with the power transistors;
f. at least a second bus structure associated with the power transistors and electrically insulated from the first bus structure; and
g. at least two emitter bias resistors connected at a common point to the emitters of each power transistor, the opposite end of one bias resistor being connected to the first bus and the opposite end of the other bias resistor being connected to the second bus, the bus structures being insulated from each other at one end thereof and connected to each other at a common point and being also connected at the common point to one of the test leads.

6. The electrical load circuit as defined in claim 5 further comprising:
h. another heat dissipating means, associated with the test leads and the battery connectors, for dissipating the heat generated at the battery terminal and for electrically insulating the test leads from each other.

7. The electrical load circuit as defined in claim 5 wherein the reverse current means comprises a high current diode.

8. The electrical load circuit as defined in claim 5 wherein the reverse current means comprises a silicon controlled rectifier.

9. The electrical load circuit as defined in claim 5 wherein said power transistors comprise NPN transistors and said reverse current means is located in series with the positive terminal.

10. The electrical load circuit as defined in claim 6 wherein the other heat dissipating means comprises a pair of hollow flexible plastic tubings attached at one end thereof to each of the battery connectors and surrounding each test lead and being connected at the other end thereof to a coolant source; and further comprising means, associated with the tubing for circulating the coolant through the tubing to cool the terminal connectors and the test leads.

11. In an electrical load circuit for a battery tester of the type comprising a test battery in series with a load bank, the improvement comprising:
a. the load bank comprising a plurality of power transistors connected in parallel to each other and in series with the test battery;
b. at least two emitter bias resistors connected at one end to a common point and to the emitters of each power transistor;
c. at least two bus structures associated with the bias resistors and being insulated from each other at one end and electrically connected to each other through their other ends; and
d. one of the emitter bias resistors of each power transistor being connected at its other end to one of the bus structures and the other of the emitter bias resistors being connected at its other end to the other of the bus structures so that the combined voltage drop across any commonly connected bias resistors will be substantially equal to the combined voltage drop across any other commonly connected bias resistors.

12. The improvement as defined in claim 11 wherein the power transistors are NPN type.

13. The improvement as defined in claim 11 wherein the power transistors are the PNP type.

14. The improvement as defined in claim 11 further comprising heat sink means, associated with the power transistors, for removing the heat generated by the power transistors.

* * * * *

PO-1050
(5/69)

UNITED STATES PATENT OFFICE
CERTIFICATE OF CORRECTION

Patent No. 3,848,181      Dated November 12, 1974

Inventor(s) JAMES O. HEBERT JR., AND DONALD F. FITZGERALD

It is certified that error appears in the above-identified patent and that said Letters Patent are hereby corrected as shown below:

In the Specification, Col. 1, Line 6 - After "new" add —and—.

In the Specification, Col. 1, Line 17 - Change "occuring to —occurring—.

In the Specification, Col. 1, Line 32 - After "60°" add —F—.

In the Specification, Col. 1, Line 32 - After "15.6°" add —C—.

In the Specification, Col. 2, Line 41 - After "circuit." Change "in" to —In—.

In the Specification, Col. 4, Line 49 - Change "tions" to —tion—.

In the Specification, Col. 6, Line 35 - After "transistors 84" add —thereby—.

In the Specification, Col. 7, Line 14 - Change "asound" to —sound—.

In the Specification, Col. 8, Line 46 - Change "leaded" to —loaded—.

In the Specification, Col. 10, Line 61 - Change "has" to —had—.

In the Specification, Col. 11, Line 4 - Change "structure" to —structures—.

Signed and sealed this 4th day of March 1975.

(SEAL)
Attest:

RUTH C. MASON
Attesting Officer

C. MARSHALL DANN
Commissioner of Patents
and Trademarks